US011819032B2

(12) United States Patent
Aly et al.

(10) Patent No.: US 11,819,032 B2
(45) Date of Patent: Nov. 21, 2023

(54) PROTEIN-BASED FLOUR SUBSTITUTE

(71) Applicant: Eshticken Holdings, Inc., Palatine, IL (US)

(72) Inventors: Mohamed Elhosiny Aly, Evansville, IN (US); Omar Mohamed Atia, Evansville, IN (US); Leslie Ann Hawkins, Henderson, KY (US); John William Pena, III, New Albany, IN (US)

(73) Assignee: ZeroCarb Inc., Evansville, IN (US)

(*) Notice: Subject to any disclaimer, the term of this patent is extended or adjusted under 35 U.S.C. 154(b) by 53 days.

(21) Appl. No.: 17/649,584

(22) Filed: Feb. 1, 2022

(65) Prior Publication Data
US 2022/0151246 A1 May 19, 2022

Related U.S. Application Data

(63) Continuation of application No. 17/339,897, filed on Jun. 4, 2021, which is a continuation-in-part of application No. 17/316,581, filed on May 10, 2021, now abandoned, which is a continuation of application No. 15/134,364, filed on Apr. 20, 2016, now abandoned, which is a continuation-in-part of application No. 13/691,831, filed on Dec. 2, 2012, now abandoned.

(60) Provisional application No. 61/566,393, filed on Dec. 2, 2011.

(51) Int. Cl.
A21D 13/41 (2017.01)
A21D 13/04 (2017.01)
A21D 13/062 (2017.01)
A21D 2/36 (2006.01)
A23L 13/50 (2016.01)
A23L 13/10 (2016.01)
A23L 13/40 (2023.01)
A21D 2/26 (2006.01)

(52) U.S. Cl.
CPC .............. A21D 13/41 (2017.01); A21D 2/261 (2013.01); A21D 2/364 (2013.01); A21D 13/04 (2013.01); A21D 13/062 (2013.01); A23L 13/10 (2016.08); A23L 13/428 (2016.08); A23L 13/43 (2016.08); A23L 13/52 (2016.08)

(58) Field of Classification Search
CPC ........ A21D 13/41; A21D 2/261; A21D 2/364; A21D 13/04; A21D 13/062; A21D 13/066; A21D 13/068; A21D 13/42; A21D 13/43; A23L 13/10; A23L 13/428; A23L 13/43; A23L 13/52

USPC ......................................................... 426/549
See application file for complete search history.

(56) References Cited

U.S. PATENT DOCUMENTS

| | | | | |
|---|---|---|---|---|
| 3,186,853 A * | 6/1965 | Meusel | ................ | A23L 13/428 426/264 |
| 3,379,141 A * | 4/1968 | Groth | ................... | A21C 11/006 426/503 |
| 3,393,074 A * | 7/1968 | Ehrlich | .................. | A21D 13/80 426/94 |
| 5,164,213 A * | 11/1992 | Bonkowski | ............ | A23B 4/285 426/652 |
| 5,775,208 A * | 7/1998 | Kimple | .................... | A21B 3/13 206/508 |
| 6,126,977 A * | 10/2000 | Bubar | ...................... | A21C 3/02 426/94 |
| 2010/0184868 A1* | 7/2010 | Lopes | .................. | A23D 7/0056 514/731 |
| 2011/0123631 A1* | 5/2011 | Walzade | ................. | A61P 33/02 514/23 |

FOREIGN PATENT DOCUMENTS

KR   20050093256 A   * 10/2005
KR   20110127510 A   * 11/2011

OTHER PUBLICATIONS

NPL Meat Crust Pizza 1 [ Reviews and comments go back 7-12 years back, one example is p. 3 third reviewer's comment has year 1995 (see NPL Meat crust Pizza 2)]. (Year: 1995).*
NPL Meat Crust Pizza 2 (reviews and comments go back 7-12 years back, one example is p. 3 third reviewer's comment has year 1995 (see NPL Meat crust Pizza 2)]. (Year: 1995).*

* cited by examiner

Primary Examiner — Donald R Spamer
Assistant Examiner — Bhaskar Mukhopadhyay
(74) Attorney, Agent, or Firm — Umair A. Qadeer

(57) ABSTRACT

An essentially carbohydrate-free, protein-based flour substitute and methods for preparing the same are disclosed herein. The flour substitute may be used to make pizza crusts, chips, taco shells, tortillas, crackers, sandwich thins, and other food products that are traditionally flour based. The organoleptic properties of the disclosed flour substitute preferably resemble the organoleptic properties of traditional baked goods and are substantially different from the organoleptic properties of traditional meat products. The disclosed flour substitute comprises a meat or nut flour, a flavor-masking spice, salt, and a vegetable, fruit, or plant-based oil or an oil-based spray. The disclosed flour substitute is used to make substitute food products that preferably resemble, in both appearance and taste, the traditional food products that the substitute food products are replacing. The flour substitute is preferably fiber-free and does not contain any other non digestible carbohydrates. Methods of preparing the disclosed flour substitute are also disclosed herein.

20 Claims, No Drawings

PROTEIN-BASED FLOUR SUBSTITUTE

CROSS-REFERENCE TO RELATED APPLICATIONS

This application is a continuation of U.S. patent application Ser. No. 17/339,897, filed on Jun. 4, 2021, which is a continuation-in-part of U.S. patent application Ser. No. 17/316,581, filed on May 10, 2021, which is a continuation U.S. patent application Ser. No. 15/134,364, filed on Apr. 20, 2016, which is a continuation-in-part of U.S. patent application Ser. No. 13/691,831, filed on Dec. 2, 2012, which claims the benefit of and priority to U.S. Provisional Patent Application Ser. No. 61/566,393, filed on Dec. 2, 2011, the entireties of which are hereby incorporated herein by reference.

BACKGROUND

Field of the Invention

The present disclosure relates to an essentially carbohydrate-free, protein-based flour substitute, and methods of preparing the same.

Description of the Related Art

As the medical profession warns of the dangers of unhealthy eating, people in the United States and worldwide are now seeking alternative forms of popular foods such as pizza, chips, and other foods containing significant amounts of carbohydrates. Consumption of excessive amounts of carbohydrates can cause a variety of health problems, See, e.g., www.eatthis.com/side-effects-of-eating-too-many-carbs. In particular, individuals suffering from Type II diabetes and others seek to limit their carbohydrate intake. The availability of a substantially carbohydrate-free flour substitute would enable such individuals to continue eating and enjoying foods like pizza, chips, tortillas, and other foods containing significant amounts of carbohydrates while remaining within their chosen or medically-necessary dietary restrictions.

With respect to pizza, although previous attempts at preparing substantially carbohydrate-free pizza crusts have focused primarily on the use of flour-based products, some efforts have been made to prepare meat-based pizza crusts. See, e.g., lowcarb.betterrecipes.com/sausage-pizza.html; www.rebelspatula.com/index.php/paleo?start=45; lowcarb-diets.about.com/od/maindishes/r/meatpizza.htm; badgerandblade.com/vb/showthread.php/206841. However, the pizza industry has thus far been unable to devise a general method of using meat to form a usable pizza crust. Previous attempts to prepare a low carbohydrate pizza crust using sausage have apparently not yielded commercially successful products. See, e.g., chicago.seriouseats.com/2008/06/lou-malnatis-chicago-deep-dish-pizza-sausage-crust-gluten-free.html. In addition, sausage-based pizza crusts are apparently not currently readily commercially available. Further, previous attempts at preparing substantially carbohydrate-free pizza crusts have generated crusts that do not taste like traditional pizza crusts, which limits the usefulness of these products. See, e.g., www.eat-drink-smile.com/2011/04/cauliflower-crust-pizza.html.

Thus there remains a need for a substantially carbohydrate-free flour substitute.

SUMMARY

An essentially carbohydrate-free, protein-based flour substitute and methods for preparing the same are disclosed herein. The flour substitute may be used to make pizza crusts, chips, taco shells, tortillas, crackers, sandwich thins, and other food products that are traditionally flour-based. The organoleptic properties of the disclosed flour substitute preferably resemble the organoleptic properties of traditional baked goods and are substantially different from the organoleptic properties of traditional meat products. The disclosed flour substitute comprises a meat or nut flour, a flavor-masking spice, salt, and a vegetable, fruit, or plant-based oil or an oil-based spray. The disclosed flour substitute is used to make substitute food products that preferably resemble, in both appearance and taste, the traditional food products that the substitute food products are replacing. The flour substitute is preferably fiber-free and does not contain any other non-digestible carbohydrates. The flour substitute also does not include a binding agent. Methods of preparing the disclosed flour substitute are also disclosed herein.

DETAILED DESCRIPTION

The present disclosure describes an essentially carbohydrate-free, protein-based flour substitute and methods for preparing the same. The flour substitute may be used to make pizza crusts, chips, taco shells, tortillas, crackers, sandwich thins, and other food products that are traditionally flour-based. The organoleptic properties of the disclosed flour substitute preferably resemble the organoleptic properties of traditional baked goods and are substantially different from the organoleptic properties of traditional meat products. The disclosed flour substitute includes a meat or nut flour, a flavor-masking spice, salt, and a vegetable, fruit, or plant-based oil or an oil-based spray. The flour substitute does not include any other ingredients that contain a non-negligible amount of carbohydrates that would be required by the U.S. Food and Drug Administration to be listed as part of a nutrition label. The flour substitute also does not include a binding agent. The disclosed flour substitute is used to make substitute food products that preferably resemble, in both appearance and taste, the traditional food products that the substitute food products are replacing. The flour substitute is preferably fiber-free and does not contain any other non-digestible carbohydrates.

The flour substitute is also preferably gluten-free, sugar-free, and dairy-free. If meat is used instead of a nut flour, the flour substitute is also preferably nut-free.

While additional ingredients may also optionally be included, these embodiments also include no binding agent and no additional ingredients containing a non-negligible amount of carbohydrates.

Binding agents are ingredients that help a mixture retain its shape or remain together. See, e.g., Smart Kitchen, "Binding Agent," available at: https://www.smartkitchen.com/resources/binding-agent ("Smart Kitchen"). Commonly used binding agents in the food industry include eggs, soy powder, rice, xanthan gum, guar gum, agar, nut and seed flours, and numerous other agents. See Smart Kitchen, supra. The use of binding agents in flour substitutes has various disadvantages. Many binding agents are carbohydrate-based. Non-carbohydrate-based binding agents frequently add a significant number of calories to a product and change the taste profile thereof. Thus, use of a binding agent in a flour substitute often presents a dilemma of deciding to add carbohydrates or significantly alter the taste profile of the product, and thus it is advantageous to avoid the use of a binding agent in a flour substitute if possible. As discussed above, the disclosed flour substitute does not include a binding agent.

In some preferred embodiments, the flour substitute may be composed of ingredients in the following ratio: about 50-150 lbs of a meat or nut flour, about 0.25-2.5 lbs of salt, about 0.25-2.5 lbs of a vegetable, fruit, or plant-based oil or an oil-based spray, and about 0.01-0.2 lbs of a flavor masking spice. In some more preferred embodiments, the flour substitute may be composed of ingredients in the following ratio: about 75-125 lbs of a meat or nut flour, about 0.5-1.5 lbs of salt, about 0.5-1.5 lbs of a vegetable, fruit, or plant-based oil or an oil-based spray, and about 0.02-0.1 lbs of a flavor-masking spice. In some even more preferred embodiments, the flour substitute may be composed of ingredients in the following ratio: about 85-115 lbs of a meat or nut flour, about 0.6-0.9 lbs of salt, about 0.6-0.9 lbs of a vegetable, fruit, or plant-based oil or an oil-based spray, and about 0.04-0.06 lbs of a flavor-masking spice.

The meat or nut flour may preferably be meat. The meat may preferably be composed of ground meat. In some preferred embodiments, the ground meat is ground chicken, more preferably ground boneless chicken breast.

The salt may be sea salt, table salt, rock salt, or another salt comprising greater than 95% sodium chloride, more preferably sea salt or table salt.

The vegetable, fruit, or plant-based oil or an oil-based spray may preferably be a vegetable oil or a vegetable oil spray. In some highly preferred embodiments, the vegetable oil or vegetable oil spray is olive oil or an olive oil spray.

The flavor-masking spice may preferably be nutmeg, cardamom, or mastic, most preferably nutmeg.

In some embodiments, the flour substitute may be used in the preparation of a food product or food product ingredient selected from the group consisting of pizza crusts, chips, crackers, tortillas, taco shells, tostada shells, pastry shells, pastry sheets, sandwich thins, bread crumbs, panko, pasta, bâton sale, stromboli dough, breads, lavosh, flatbreads, panini breads, pita breads, naan, roti, paratha, focaccia, sesame sticks, kibbeh base, tempura batter, filo dough, pancakes, waffles, pakora batter, pie crusts, pot pie crusts, vegetable pie crusts, meat pie crusts, zaatar pie crusts, sfeeha crusts, croquette shells, empanada shells, egg roll shells, samosa shells, spring roll shells, pizza roll shells, calzone shells, wraps, takis chips, dumpling shells, and protein bars.

Bread crumbs composed of the disclosed flour substitute may be used as a bread crumb substitute in food products including cheese curds, onion rings, breaded pickles, breaded mushrooms, stuffed mushrooms, chicken nuggets, chicken tenders, jalapeño poppers, breaded eggplant, breaded okra, breaded shrimp, breaded popcorn shrimp, breaded calamari, eggplant parmesan, chicken parmesan, breaded cauliflower, crab cakes, coconut chicken, coconut shrimp, chicken wings, breaded fish, fish sticks, fish filets, salmon patties, ravioli, zucchini au gratin, breaded tomatoes, breaded corn, cutlets, breaded green beans, zucchini fries, tempura, milanesa, apple grande, breaded cheese, mozzarella sticks, meatballs, meatloaf, and gyro meat.

Methods of preparing food products using the disclosed flour substitute are also disclosed herein.

In some embodiments, a method of preparing a food product that uses a flour substitute includes at least the following steps in order: (1) meat or nuts are ground in a grinding apparatus; (2) salt and at least one flavor-masking spice are separately pre-mixed to yield a salt-spice mixture; (3) the ground meat or nuts is mixed with the salt-spice mixture to yield a first ground dough mixture; (4) the first ground dough mixture is optionally ground again in the grinding apparatus to yield a second ground dough mixture; (5) the second ground dough mixture, or alternatively the first ground dough mixture, is portioned into dough balls: (6) each dough ball is coated with a vegetable, fruit, or plant-based oil or an oil-based spray; (7) each dough ball is placed on a first nonstick mat positioned at the bottom of a dough press; (8) a second nonstick mat is placed on top of the dough ball; (9) the dough ball is pressed with the dough press to yield a pressed dough ball assembly that is composed of a pressed dough ball positioned between the first nonstick mat and the second nonstick mat; (10) the first and second nonstick mats are removed from the pressed dough ball; (11) the pressed dough ball is transferred into an oven and baked; and (12) the baked pressed dough ball is removed from the oven, optionally cooled, and optionally wrapped and/or frozen.

In some embodiments, a method of preparing a food product that uses a flour substitute includes at least the following steps in order: (1) meat or nuts are ground in a grinding apparatus; (2) the ground meat or nuts is mixed with salt, at least one flavor-masking spice, and a vegetable, fruit, or plant-based oil to yield a dough mixture; (3) the dough mixture is portioned into dough balls; (4) each dough ball is placed on a first nonstick mat positioned at the bottom of an automated dough press; (5) a second nonstick mat is placed on top of the dough ball; (6) the dough ball is pressed with the dough press to yield a pressed dough ball assembly that is composed of a pressed dough ball positioned between the first nonstick mat and the second nonstick mat; (7) the pressed dough ball assembly is placed in an oven and partially baked in a first baking step; (8) the partially-baked pressed dough ball assembly is removed from the oven and the first and second nonstick mats are removed from the partially-baked pressed dough ball; (9) the partially-baked pressed dough ball is transferred into the oven again and baked in a second baking step; and (10) the baked pressed dough ball is removed from the oven, optionally cooled, and optionally wrapped and/or frozen.

In some embodiments, a method of preparing a food product that uses a flour substitute includes at least the following steps in order: (1) meat or nuts are ground in a grinding apparatus; (2) the ground meat or nuts is mixed with salt, at least one flavor-masking spice, and a vegetable, fruit, or plant-based oil to yield a dough mixture; (3) the dough mixture is portioned into dough balls; (4) each dough ball is transferred to the bottom of a heated dough press that is coated with a nonstick coating on its contact surfaces; (6) the dough ball is pressed and heated with the dough press to yield a partially-baked pressed dough ball; (7) the partially-baked pressed dough ball is removed from the dough press; (8) the partially-baked pressed dough ball is transferred into an oven and baked in a second baking step; and (9) the baked pressed dough ball is removed from the oven, optionally cooled, and optionally wrapped and/or frozen.

In some embodiments, a method of preparing a food product that uses a flour substitute includes at least the following steps in order: (1) meat or nuts are ground in a grinding apparatus; (2) the ground meat or nuts is mixed with salt, at least one flavor-masking spice, and a vegetable, fruit, or plant based oil to yield a dough mixture; (3) the dough mixture is formed into a dough sheet using a extruder or sheeter; (4) the dough sheet is transferred to the bottom of a heated dough press that is coated with a nonstick coating on its contact surfaces; (5) the dough sheet is pressed and heated with the dough press to yield a partially-baked pressed dough sheet; (6) the partially-baked pressed dough sheet is removed from the dough press; (7) the dough sheet is subdivided into partially-baked pressed dough products of the desired shape; (8) the partially-baked pressed dough products are transferred into an oven and baked in a second baking step to yield baked pressed dough products; (9) the baked pressed dough products are removed from the oven and optionally cooled; and (10) the baked pressed dough products are optionally wrapped and/or frozen.

Pizza Crust Ingredients

In some embodiments, the flour substitute is used to make an essentially carbohydrate-free pizza crust.

In some preferred embodiments, the pizza crust is composed of ingredients in the following ratios: about 50-150 lbs of a meat or nut flour, about 0.25-2.5 lbs of salt, about 0.25-2.5 lbs of a vegetable, fruit, or plant-based oil or an oil-based spray, and about 0.01-0.2 lbs of a flavor-masking spice. In some more preferred embodiments, the flour substitute is composed of ingredients in the following ratios: about 75-125 lbs of a meat or nut flour, about 0.5-1.5 lbs of salt, about 0.5-1.5 lbs of a vegetable, fruit, or plant-based oil or an oil-based spray, and about 0.02-0.1 lbs of a flavor-masking spice. In some even more preferred embodiments, the flour substitute is composed of ingredients in the following ratios: about 85-115 lbs of a meat or nut flour, about 0.6-0.9 lbs of salt, about 0.6-0.9 lbs of a vegetable, fruit, or plant-based oil or an oil-based spray, and about 0.04-0.06 lbs of a flavor-masking spice. While additional ingredients may also optionally be included, these embodiments include no binding agent and no additional ingredients containing a non-negligible amount of carbohydrates.

In some alternate embodiments, the pizza crust base is composed of ingredients in the following ratios: about 40 lbs of meat or a nut flour, about 4-7 tablespoons of salt, about 2-5 fluid oz of a vegetable, fruit, or plant-based oil or an oil-based spray, and about ¼-¾ tablespoon of a flavor-masking spice. In some alternate preferred embodiments, the pizza crust base is composed of ingredients in the following ratios: about 40 lbs of poultry, about ⅖-½ tablespoon of nutmeg, about 5-6 tablespoons of salt, and about 3-4 fluid oz of olive oil or olive oil spray. In some alternate more preferred embodiments, the pizza crust base is composed of ingredients in the following ratios: about 40 lbs of boneless chicken breast, about ⅖-½ tablespoon of nutmeg, about 5-6 tablespoons of salt, and about 3-4 fluid oz of olive oil or olive oil spray. In some alternate highly preferred embodiments, the pizza crust base is composed of ingredients in the following ratios; about 40 lbs of boneless chicken breast, about 6/13 tablespoon of nutmeg, about 57/13 tablespoons of salt, and about 3½ fluid oz of olive oil spray. While additional ingredients may also optionally be included, these embodiments include no binding agent and no additional ingredients containing a non-negligible amount of carbohydrates.

Boneless chicken breast, salt, and olive oil contain no carbohydrates, and the amount of carbohydrates introduced by using nutmeg is negligible. See ndb.nal.usda.gov/ndb/foods. Thus a pizza crust base comprising these ingredients and including no additional ingredients containing a non-negligible amount of carbohydrates is essentially carbohydrate-free.

The organoleptic properties of flour substitute products prepared according to the disclosed methods preferably resemble the organoleptic properties of traditional baked goods and are substantially different from the organoleptic properties of traditional meat products. For example, pizza crusts prepared according to the disclosed methods preferably are substantially similar to crusts of traditional thin crust pizza in both appearance and taste. Thus, when boneless chicken breast is used to prepare the pizza crust, the pizza crust unexpectedly does not taste like chicken but instead tastes substantially similar to a traditional flour-based pizza crust.

Small-Scale Pizza Crust Preparation

In some preferred embodiments, the pizza crust is prepared from the ingredients that compose the pizza crust base according to the method described below for small-scale preparation, such as for in-home or restaurant preparation.

When meat is used, substantially all fats and connective tissues may preferably be removed from the meat. The meat may then be cut into small pieces to yield cubed meat. The pieces of meat may preferably be approximately cubic and approximately 1-2 inches per side. The meat is then ground to yield ground meat. Alternatively, the meat may be used without being cut into small pieces before grinding. The meat may preferably be chicken, more preferably boneless chicken breast.

The salt and the flavor-masking spice are preferably thoroughly premixed to yield a salt/spice mixture. In some embodiments, the vegetable, fruit, or plant-based oil or oil-based spray is then preferably mixed with the salt/spice mixture to yield a salt/spice/oil mixture. In alternate embodiments, the appropriate amount of salt, the flavor-masking spice, and the vegetable, fruit, or plant-based oil or oil-based spray are added directly to the cubed meat without premixing.

In some alternate embodiments, the salt/spice mixture, salt/spice/oil mixture, or the non-premixed salt, spice, and oil are added to a nut flour.

In some alternate embodiments, the salt/spice mixture or non-premixed salt and spice are added to the meat or nut flour before the vegetable, fruit, or plant-based oil or oil-based spray is added to the combined ingredients.

The salt is preferably table salt or sea salt. The flavor-masking spice is preferably nutmeg. The vegetable, fruit, or plant-based oil or oil-based spray is preferably olive oil.

In some embodiments, about 60 tablespoons of stab and about 5 tablespoons of the flavor-masking spice are premixed, and about 6 tablespoons of this salt/spice mixture are added to 40 lbs of cubed meat. Other embodiments may use the same ratios but different absolute amounts of salt, the flavor-masking spice, and meat. The salt and flavor-masking spice may preferably be premixed by hand. Alternately, the spice and flavor-masking spice may be mechanically premixed using a mixing apparatus. The cubed meat or nut flour is thoroughly mixed with the salt/spice mixture or the non-premixed salt and spice to yield a seasoned meat mixture. The cubed meat or nut flour and the salt/spice mixture or the non-premixed salt and spice may be mixed by hand or may alternately be mixed using a mixing apparatus.

The seasoned meat mixture is then ground one or more times according to the following procedure. The seasoned meat mixture may preferably be ground more than once. The seasoned meat mixture is placed into a grinding device such as a grinder, food processor, blender, or similar small appliance, thoroughly ground, and removed from the grinding device to yield a first ground meat mixture. The first ground meat mixture is then preferably placed into the grinding device again, thoroughly ground again, and then removed from the grinding device to yield a second ground meat mixture. The grinding procedure may be repeated as many times as is necessary to achieve the desired consistency for the ground meat mixture. The ground meat mixture generated by the final iteration of the grinding procedure is subsequently used to prepare the pizza crust.

The final ground meat mixture is then formed into dough balls. Each dough ball may preferably weigh between about 4-16 oz. To prepare an 8-inch pizza crust, a dough ball may preferably weigh between about 5-7 oz, more preferably about 6 oz. To prepare a 12-inch pizza crust, a dough ball may preferably weigh between about 11-13 oz, more preferably about 12 oz. Each dough ball is coated with the appropriate amount of oil or oil-based spray to yield an oil-coated dough ball. Preferably, each dough ball is sprayed with about 1-4 sprays of olive oil spray, more preferably 1-2 sprays. The oil or oil-based spray reduces adhesion of the dough ball to other materials. The oil-coated dough ball serves as the base for the pizza crust.

The oil-coated dough ball is then placed into approximately the center of a dough press. In more preferred embodiments, before placing the oil-coated dough ball in the dough press, the oil-coated dough ball is placed on a sheet of aluminum foil and parchment paper or another material that assists in generating a non-stick environment is placed on top of the oil-coated dough ball. A metal pan is preferably placed above the bottom section of the dough press, underneath the top section of the dough press, parchment paper, oil-coated dough ball, and aluminum foil sheet. The metal pan may be made of stainless steel, cast iron, aluminum, copper, or another metal or alloy. The metal pan may preferably be a stainless steel. The metal pan may preferably be circular.

The oil-coated dough ball is then pressed into a raw pizza crust using the dough press. The raw pizza crust is preferably circular or approximately circular. The parchment paper is preferably removed before baking the raw pizza crust.

The raw pizza crust is then baked, preferably in a pre-heated oven, at a temperature between about 300-600° F. for about 3-15 min. In more preferred embodiments, the raw pizza crust is baked in a pre-heated oven between about 550-600° F. for between 7-8 min. In highly preferred embodiments, the raw pizza crust is baked at about 575° F. for about 7½ min.

The pizza crust is then removed from the oven and allowed to stand at ambient temperature for a period of time. The period of time may preferably be between about 5 min-2 h, more preferably about 15 min.

The crust is then ready to be used for its designated purpose. The crust may be wrapped and frozen, and may be used for up to about 3 months.

Commercial Pizza Crust Preparation

In some preferred embodiments, the pizza crust is prepared from the ingredients that compose the pizza crust base according to the method described below for commercial preparation, such as for preparation in a mass production facility.

The meat or nut flour is preferably meat, most preferably ground boneless chicken breast. The salt is preferably table salt or sea salt. The flavor-masking spice is preferably nutmeg. The vegetable, fruit, or plant-based oil or oil-based spray is preferably olive oil.

In some preferred embodiments, the pizza crust is composed of ingredients in the following ratios: about 50-150 lbs of boneless chicken breast, about 0.25-2.5 lbs of salt, about 0.25-2.5 lbs of olive oil, and about 0.01-0.2 lbs of nutmeg. In some more preferred embodiments, the flour substitute is composed of ingredients in the following ratios: about 75-125 lbs of boneless chicken breast, about 0.5-1.5 lbs of salt, about 0.5-1.5 lbs of olive oil, and about 0.02-0.1 lbs of nutmeg. In some even more preferred embodiments, the flour substitute is composed of ingredients in the following ratios: about 85-115 lbs of boneless chicken breast, about 0.6-0.9 lbs of salt, about 0.6-0.9 lbs of olive oil, and about 0.04-0.06 lbs of nutmeg. While additional ingredients may also optionally be included, these embodiments include no binding agent and no additional ingredients containing a non-negligible amount of carbohydrates.

Boneless chicken breast is ground in a grinding apparatus, and the ground boneless chicken breast is mixed with salt, olive oil, and nutmeg using a mixing apparatus to yield a ground dough mixture. The grinding apparatus removes coarse material that is not sufficiently finely ground, such as connective tissues. Ordinary skilled artisans will understand how to select a grinding apparatus and mixing apparatus that is appropriate for the amount of chicken breast being ground and mixed. The ground dough mixture is portioned into dough balls. The dough balls are approximately 5-7 oz for 8" round pizza crusts, more preferably about 6 oz. The dough balls are approximately 11-13 oz for 12" round pizza crusts, more preferably about 12 oz.

In medium-scale commercial preparation procedures, a dough ball is placed on a first nonstick mat positioned at the bottom of an automated dough press. A second nonstick mat is placed on top of the dough ball. The dough ball is then pressed with the dough press to yield a pressed dough ball assembly that is composed of a pressed dough ball positioned between the first nonstick mat and the second nonstick mat. The pressed dough ball assembly is placed in a conveyor oven and partially baked in a first baking step to yield a partially-baked pressed dough ball assembly. The baking temperature for the first baking step is preferably between about 400-600° F., more preferably between about 475-525 and even more preferably about 500° F. The baking time for the first baking step is between about 1-3 min, preferably between about 1-2 min, and even more preferably about 1 min, 50 sec. After partial baking, the partially-baked pressed dough ball assembly is removed from the conveyor oven and the first and second nonstick mats are removed from the partially-baked pressed dough ball. The partially-baked pressed dough ball is then placed into the conveyor oven again and baked in a second baking step. The baking temperature for the second baking step is preferably between about 400-600° F., more preferably between about 475-525° F., and even more preferably about 500° F. The baking time for the second baking step is between about 1-3 min, preferably between about 1-2 min., and even more preferably about 1 min, 50 sec.

In full-scale commercial preparation procedures, the dough ball is placed at the bottom of an automated heated dough press that is coated with a nonstick coating, such as a polytetrafluoroethylene coating. The dough ball is then pressed and partially-baked in the heated dough press in a first baking step to yield a partially-baked pressed dough ball. The baking temperature for the first baking step is preferably between about 275-450° F., more preferably between about 300-350 and even more preferably about 325° F. The baking time for the first baking step is, preferably between about 1-10 sec, more preferably between about 3-6 sec, and even more preferably about 5 sec. The partially-baked pressed dough ball is then removed from the heated dough press. The partially-baked dough ball is then placed into the conveyor oven and baked in a second baking step. The baking temperature for the second baking step is preferably between about 400-600° F., more preferably between about 475-525° F., and even more preferably about 500° F. The baking time for the second baking step, is between about 1-3 min, preferably between about 1-2 min, and even more preferably about 1 min, 50 sec.

The pressed dough ball is baked for a temperature and duration such that its internal temperature reaches a minimum of 165° F. throughout the baked pizza crust.

After baking, the pizza crust is removed from the oven, optionally wrapped, and placed in a freezer. The freezer temperature is below 32° F. Multiple pizza crusts prepared using the disclosed method are preferably interleaved with separator sheets, wrapped or otherwise packaged, and then frozen.

The pizza crust may be used for up to about 6-9 months.

Preparation of Tortillas, Taco Shells, and Chips

In some preferred embodiments, a product such as tortilla chips, taco shells, or bread crumbs are prepared from the ingredients that compose the product according to the method described below for large-scale commercial preparation, such as for preparation in a mass production facility.

The meat or nut flour is preferably meat, most preferably ground boneless chicken breast. The salt is preferably table salt or sea salt. The flavor-masking spice is preferably nutmeg. The vegetable, fruit, or plant-based oil or oil-based spray is preferably olive oil.

In some preferred embodiments, the product is composed of ingredients in the following ratios: about. 50-150 lbs of boneless chicken breast, about 0.25-2.5 lbs of salt, about 0.25-2.5 lbs of olive oil, and about 0.01-0.2 lbs of nutmeg. In some more preferred embodiments, the flour substitute is composed of ingredients in the following ratios: about 75-125 lbs of boneless chicken breast, about 0.5-1.5 lbs of salt, about 0.5-1.5 lbs of olive oil, and about 0.02-0.1 lbs of nutmeg. In some even more preferred embodiments, the flour substitute is composed of ingredients in the following ratios: about 85-115 lbs of boneless chicken breast, about 0.6-0.9 lbs of salt, about 0.6-0.9 lbs of olive oil, and about 0.04-0.06 lbs of nutmeg. While additional ingredients may also optionally be included, these embodiments include no binding agent and no additional ingredients containing a non-negligible amount of carbohydrates.

Boneless chicken breast is ground in a grinding apparatus, and the ground boneless chicken breast is mixed with salt, olive oil, and nutmeg using a mixing apparatus to yield a ground dough mixture. The grinding apparatus removes coarse material that is not sufficiently finely ground, such as connective tissues. Ordinary skilled artisans will understand how to select a grinding apparatus and mixing apparatus that is appropriate for the amount of chicken breast being ground and mixed. The ground dough mixture is portioned into dough balls. The dough balls are preferably approximately 0.5-3.0 oz, more preferably about 1 oz or about 1.5 oz depending on the specific product to be produced. For example, 1.0 oz dough balls are preferred for use in making taco shells, chips, and wraps and 1.5 oz dough balls are preferred for use in making tortillas.

In medium-scale commercial preparation procedures, the dough ball is placed on a first nonstick mat positioned at the bottom of an automated dough press. A second nonstick mat is placed on top of the dough ball. The dough ball is then pressed with the dough press to yield a pressed dough ball assembly that is composed of a pressed dough ball positioned between the first nonstick mat and the second nonstick mat. The pressed dough ball assembly is placed in a conveyor oven and partially baked in a first baking step to yield a partially-baked pressed dough ball assembly. The baking temperature for the first baking step is preferably between about 400-600° F., more preferably between about 475-525° F., and even more preferably about. 500° F. The baking time for the first baking step is between about 1-3 min, preferably between about 1-2 min, and even more preferably about 1 min, 50 sec. The partially-baked pressed dough ball assembly is removed from the conveyor oven and the first and second nonstick mats are removed from the partially-baked pressed dough ball. The partially-baked pressed dough ball is then placed into the conveyor oven again and baked in a second baking step to yield a baked pressed dough ball. The baking temperature for the second baking step is preferably between about 400-600° F., more preferably between about 475-525° F., and even more preferably about 500° F. The baking time for the second baking step is between about 1-3 min, preferably between about 2 min, and even more preferably about 1 min, 50 sec.

In full-scale commercial preparation procedures, the dough ball is placed at the bottom of an automated heated dough press that is coated with a nonstick coating, such as a polytetrafluoroethylene coating. The dough ball is then pressed and partially-baked in the heated dough press in a first baking step to yield a partially-baked pressed dough ball. The baking temperature for the first baking step is preferably between about 275-450° F., more preferably between about 300-350° F., and even more preferably about 325° F. The baking time for the first baking step is preferably between about 1-10 sec, more preferably between about 3-6 sec, and even more preferably about 5 sec. The partially-baked pressed dough ball is then removed from the heated dough press. The partially-baked pressed dough ball is then placed into the conveyor oven and baked in a second baking step to yield a baked product. The baking temperature for the second baking step is preferably between about 400-600° F. more preferably between about 475-525° F., and even more preferably about 500° F. The baking time for the second baking step is between about 1-3 min, preferably between about 1-2 min, and even more preferably about 1 min, 50 sec.

The dough ball is baked for a temperature and duration such that its internal temperature reaches a minimum of 165° F. throughout the product.

For tortilla chips, the baked product is cut into appropriately sized pieces, fried in oil, and tossed in seasoning to coat the tortilla chips.

For taco shells, the baked product is shaped into an appropriate shape and fried in oil.

For bread crumbs, the baked product is dehydrated and then ground, alternately fried in oil and then ground, or alternately fried in oil, then dehydrated, and then ground.

For pasta, the baked product is cut into the desired shape for the specific type of pasta substitute being produced.

Extrusion

In some embodiments, instead of portioning the ground dough mixture into dough balls, the ground dough mixture is transferred into an extruder or sheeter apparatus and is extruded into a dough sheet. The dough sheet is pressed in a heated dough press to generate a partially-baked pressed dough sheet. The partially-baked pressed dough sheet is then processed using a mold or die to make partially-baked intermediates with the desired product shape and weight, such as pizza crusts, tortilla chips, pasta, crackers, etc. Alternately, the heated dough press includes a mold or die, such that the dough sheet is pressed, heated, and processed into the desired product shape in the heated dough press to yield partially-baked intermediates with the desired product shape and weight upon removal from the heated dough press. These alternate embodiments allow production of multiple product units at the same time, which enhances production efficiency. The second baking step and any additional steps are then carried out as described above.

Example of Small-Scale Preparation

Boneless, skinless chicken breast was cleaned by removing substantially all fats and connective tissues. The chicken was then cut into small pieces to yield 40 lbs of cubed chicken. The pieces of cubed chicken were approximately cubic and approximately 1-2 inches per side. The chicken was then ground in a grinding apparatus to yield ground chicken. Separately, 60 tbsp of salt and 5 tbsp of nutmeg were thoroughly premixed to yield a salt/nutmeg mixture. 6 tbsp of the salt/nutmeg mixture were added to the ground chicken and mixed to yield a first ground chicken mixture. The ground chicken mixture was then ground again to yield a second ground chicken mixture.

The second ground meat mixture was then formed into dough balls. Each dough ball was coated with 1-2 sprays of olive oil spray to yield an oil-coated dough ball. The oil-coated dough ball was then placed onto a sheet of aluminum foil and parchment paper was placed on top of the oil-coated dough ball to yield an oil-coated dough ball assembly, and then the oil-coated dough ball assembly was placed into approximately the center of a dough press. A stainless steel pan was placed above the bottom section of the dough press, underneath the top section of the dough press and oil-coated dough ball assembly. The oil-coated dough ball was then pressed into a raw pizza crust using the dough press. The raw pizza crust was approximately circular. The parchment paper was removed before baking the raw pizza crust.

The raw pizza crust was baked in a pre-heated oven at 575° F. for 7½ min, and was then removed from the oven and allowed to stand at ambient temperature for about 15 min.

The crust was then wrapped and frozen.

Examples of Commercial Preparation 100 lbs of boneless, skinless chicken breast was ground once in a Biro grinder with a ⅛" plate and then ground a second time in a Hollymatic mixer/grinder with a ⅛" plate and a bone separator. The bone separator was used to remove hard material such as bones or connective tissue from the chicken. The ground chicken was transferred into a Leland mixer, olive oil, salt, and nutmeg were added, and the chicken, olive oil, salt, and nutmeg were mixed together to form a ground chicken mixture. The ground chicken mixture was transferred into a VMag vacuum stuffer and portioned into dough balls.

For 8" round pizza crusts, the dough balls were each 5.7 oz. For 12" round pizza crusts, the dough balls were each 12 oz. For tortillas, taco shells, and chips, the dough balls were 1.5 oz. For thin chips, the dough balls were 1 oz.

For medium-scale commercial preparation, each dough ball was placed on a first nonstick mat positioned at the bottom of a modified DoughPro dough press. A second nonstick mat was placed on top of the dough ball. The dough ball was then pressed with the dough press to yield a pressed dough ball assembly that was composed of a pressed dough ball positioned between the first nonstick mat and the second nonstick mat. The pressed dough ball assembly was placed in a Lincoln Impinger conveyor oven and partially baked at 500° F. for 1 min, 50 sec to yield a partially-baked pressed dough ball. After partial baking, the partially-baked pressed dough ball assembly was removed from the conveyor oven and the first and second nonstick mats were removed from the partially-baked pressed dough ball. The partially-baked pressed dough ball was then transferred into the conveyor oven again and baked at 500° F. for 1 min, 50 sec to yield a baked pressed dough ball.

For full-scale commercial preparation, each dough ball was placed at the bottom of an AM Manufacturing Teflon®-coated heated dough press with heating elements situated on both sides of the press, such that the dough ball was heated from both sides when heated in the press. The dough ball was pressed and partially-baked in the heated dough press at 325 degrees for 5 sec to yield a partially-baked pressed dough ball. The partially-baked pressed dough ball was then removed from the heated dough press. The partially-baked pressed dough ball was then transferred into a conveyor oven and baked at 500° F. for 1 min, 50 sec to yield a baked pressed dough ball.

The pressed dough balls were baked for a temperature and duration such that their internal temperature reached a minimum of 165° F. throughout.

For pizza crusts, after baking, the pizza crust was removed from the oven, wrapped, and placed in a freezer. The freezer temperature was below 32° F. Multiple pizza crusts prepared using the disclosed method were interleaved with separator sheets, wrapped, and then frozen.

For tortilla chips, the baked product was cut into appropriately sized pieces, fried in oil, and tossed in seasoning to coat the tortilla chips.

For taco shells, the baked product was shaped into an appropriate shape and fried in oil.

For bread crumbs, the baked product was dehydrated and then ground, alternately fried in oil and then ground, or alternately fried in oil, then dehydrated, and then ground.

For pasta, the baked product was cut into the desired shape for the specific type of pasta substitute being produced.

The previous description of the disclosed embodiments is provided to enable any person skilled in the art to make or use the invention disclosed herein. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments described herein but is to be accorded the widest scope consistent with the principles and novel features disclosed herein.

All references cited herein are expressly incorporated by reference.

What is claimed is:

1. A method of preparing a flour substitute product comprising (i) meat, (ii) salt, (iii) a flavor-masking spice, and (iv) a vegetable oil, fruit oil, plant-based oil, or oil-based spray,
   wherein the flour substitute product is essentially carbohydrate-free and essentially fiber-free;
   wherein the flour substitute product does not include a binding agent;
   wherein the method comprises the steps of:
   a. grinding the meat;
   b. mixing the meat with the salt, flavor-masking spice, and vegetable, fruit, or plant-based oil to yield a seasoned meat mixture;

c. forming a dough ball from a portion of the ground meat mixture;
d. placing the dough ball in a dough press;
e. pressing the dough ball with the dough press to generate a raw flour substitute product; and
f. baking the raw flour substitute product to yield the flour substitute product.

2. The method of claim 1, wherein the meat is boneless chicken breast.

3. The method of claim 1, wherein the flavor-masking spice is selected from the group consisting of nutmeg, cardamom, and mastic.

4. The method of claim 2, wherein the flavor-masking spice is nutmeg.

5. The method of claim 1, wherein the oil or oil-based spray is olive oil or an olive oil spray.

6. The method of claim 4, wherein the oil or oil-based spray is olive oil or an olive oil spray.

7. The method of claim 4, wherein the oil or oil-based spray is olive oil.

8. The method of claim 7, wherein the flour substitute comprises ingredients in the ratio of:
  a. about 50-150 lbs of boneless chicken breast;
  b. about 0.25-2.5 lbs of salt;
  c. about 0.25-2.5 lbs of olive oil; and
  d. about 0.01-0.2 lbs of nutmeg.

9. The method of claim 7, wherein the flour substitute comprises ingredients in the ratio of:
  a. about 85-115 lbs of boneless chicken breast;
  b. about 0.6-0.9 lbs of salt;
  c. about 0.6-0.9 lbs of olive oil; and
  d. about 0.04-0.06 lbs of nutmeg.

10. The method of claim 1, wherein the raw flour substitute product is baked in two separate baking steps.

11. The method of claim 9, wherein the raw flour substitute product is baked in two separate baking steps.

12. The method of claim 1, wherein the dough press is a heated dough press.

13. The method of claim 1, wherein the dough ball is placed between two nonstick mats before it is pressed in the dough press.

14. The method of claim 1, wherein the dough press is coated with a nonstick coating.

15. The method of claim 12, wherein the dough press is coated with a nonstick coating.

16. The method of claim 12, wherein the raw flour substitute product is baked in two separate baking steps, wherein the raw flour substitute product is baked in a first baking step for a first baking time between about 1-10 seconds to generate a partially-baked dough ball, and wherein the partially-baked dough ball is baked in a second baking step for a second baking time.

17. The method of claim 1, wherein the flour substitute product may be used in the preparation of pizza.

18. The method of claim 1, wherein the flour substitute product may be used in the preparation of a food product or food product ingredient selected from the group consisting of pizza crusts, chips, crackers, tortillas, taco shells, tostada shells, pastry shells, pastry sheets, sandwich thins, bread crumbs, panko, pasta, baton sale, stromboli dough, breads, lavosh, flatbreads, panini breads, pita breads, naan, roti, paratha, focaccia, sesame sticks, kibbeh base, tempura batter, filo dough, pancakes, waffles, pakora batter, pie crusts, pot pie crusts, vegetable pie crusts, meat pie crusts, zaatar pie crusts, sfeeha crusts, croquette shells, empanada shells, egg roll shells, samosa shells, spring roll shells, pizza roll shells, calzone shells, wraps, takis chips, dumpling shells, and protein bars.

19. The method of claim 18, wherein the flour substitute product may be used in the preparation of bread crumbs.

20. The method of claim 19, wherein the bread crumbs may be used as a bread crumb substitute in a food product selected from the group consisting of cheese curds, onion rings, breaded pickles, breaded mushrooms, stuffed mushrooms, chicken nuggets, chicken tenders, jalapeno poppers, breaded eggplant, breaded okra, breaded shrimp, breaded popcorn shrimp, breaded calamari, eggplant parmesan, chicken parmesan, breaded cauliflower, crab cakes, coconut chicken, coconut shrimp, chicken wings, breaded fish, fish sticks, fish filets, salmon patties, ravioli, zucchini au gratin, breaded tomatoes, breaded corn, cutlets, breaded green beans, zucchini fries, tempura, milanesa, apple grande, breaded cheese, mozzarella sticks, meatballs, meatloaf, and gyro meat.

* * * * *